M. KRULAN & A. P. LAUSTER.
REEL AND SUPPORTING DEVICE FOR LINES.
APPLICATION FILED OCT. 14, 1911.
1,043,943.
Patented Nov. 12, 1912.
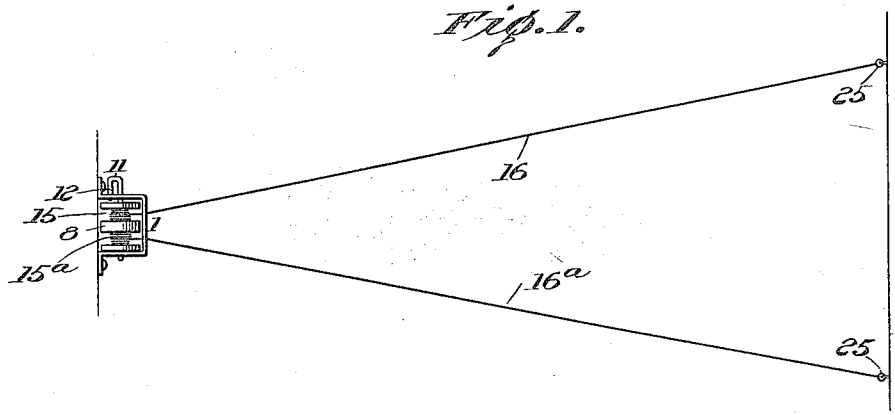
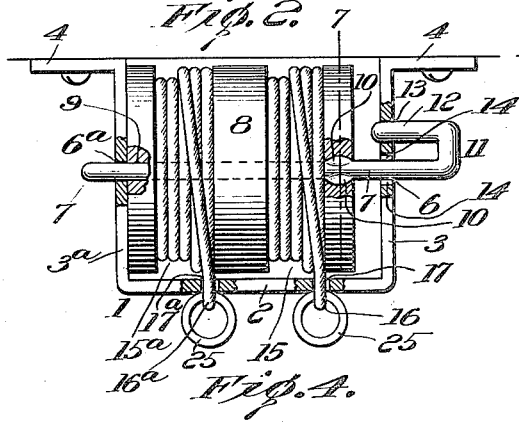
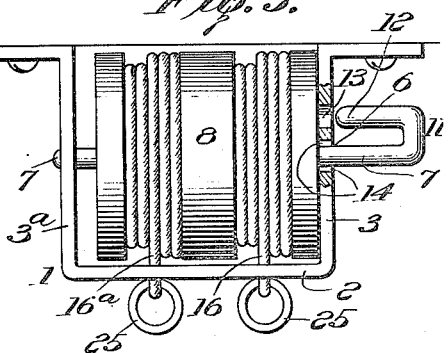
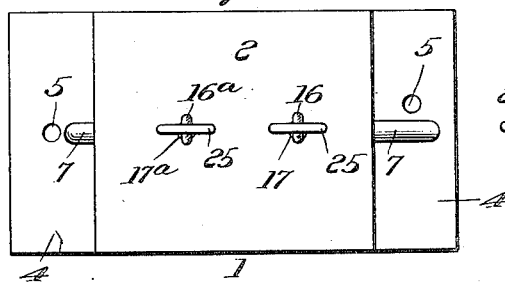
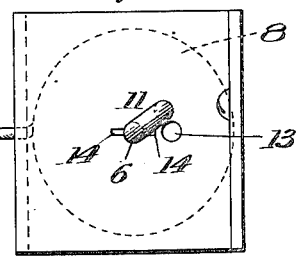
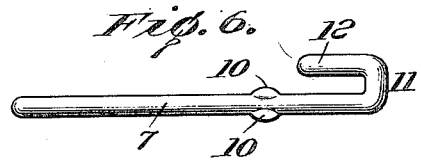
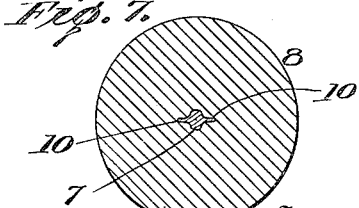

UNITED STATES PATENT OFFICE.

MICHAEL KRULAN, OF PATERSON, NEW JERSEY, AND AUGUST P. LAUSTER, OF NEW YORK, N. Y.; SAID LAUSTER ASSIGNOR TO SAID KRULAN.

REEL AND SUPPORTING DEVICE FOR LINES.

1,043,943.   Specification of Letters Patent.   Patented Nov. 12, 1912.

Application filed October 14, 1911. Serial No. 654,674.

*To all whom it may concern:*

Be it known that we, MICHAEL KRULAN and AUGUST P. LAUSTER, citizens of the United States, residing at Paterson and New York, respectively, in the county of Passaic and State of New Jersey, and in the county of New York and State of New York, respectively, have invented a new and useful Reel and Supporting Device for Lines, of which the following is a specification.

This invention is a reel and supporting device for lines, and particularly clothes lines.

The object of the invention is to provide an improved reel and support for lines which will be simple in construction and operation and which may be manufactured at a minimum cost.

Referring to the drawing Figure 1 is a plan view showing our invention in use. Fig. 2 is an enlarged plan view of our invention showing the reel, with the line wound up thereupon, locked against rotation. Fig. 3 is an enlarged plan view of our invention showing the reel, with the line wound thereupon, unlocked and ready to be rotated to let out the line. Fig. 4 is a front elevation of our invention. Fig. 5 is a side elevation of our invention showing the crank for rotating the reel and the means for locking the reel against rotation. Fig. 6 is a detail view of the spindle upon which the reel is mounted. Fig. 7 is a detail sectional view taken on line 7 of Fig. 2 showing the means for fastening the reel to the spindle.

The numeral 1 in the drawing designates a bracket, which comprises a front wall 2 side walls 3 and 3ª and ears 4 which are adapted to rest against a suitable support. The ears 4 are provided with holes 5 through which screws or nails may be driven into the support to attach the bracket thereto in position for use. The walls 3 and 3ª of the bracket are respectively provided with holes 6 and 6ª to receive the spindle 7. A reel 8 is provided with a central axial opening 9 through which the spindle 7 is also inserted when the spindle is inserted through the openings 6 in the bracket 1, whereby the reel 8 is rotatably mounted in the bracket. The spindle 7 is provided with keys 10 which are driven into the reel 8 when the spindle is inserted through the opening 9 therein, whereby the reel is made fast to the spindle, so that it will rotate therewith. One end of the spindle 7 is bent in the form of a hook to form a crank 11 and a locking element 12. The wall 3 is provided with a hole 13 to receive the end of the locking element 12 to lock the reel against rotation when so desired. Slots 14 are formed at each side of the hole 6 so that the keys 10 may be inserted through the wall 3 so that said portions may be driven into the reel to secure the reel to the spindle, when the spindle is inserted through the openings 6 and 6ª in position in the bracket 1. The keys 10 are preferably located near the crank end of the spindle or near the end which enters the opening 9 in the reel last, so that it will be necessary only to drive the keys 10 a short distance into the reel, in order to secure the reel to the spindle. The distance between the walls 3 and 3ª and the width of the reel 8 are of such dimensions that the reel may be moved axially a short distance so that the locking element 12 may be inserted in the opening 13 to lock the reel against rotation or removed from said opening to unlock the reel to enable it to be rotated. The reel 8 preferably comprises two spools 15 and 15ª, upon which the lines 16 and 16ª are wound, but we do not limit ourselves to this particular number of spools. The front wall 2 of the bracket 1 is provided with holes 17 and 17ª through which the lines 16 and 16ª extend from the spools 15 and 15ª. Rings 25 may be fastened to the ends of the lines 16 and 16ª to engage the wall 1 of the bracket, to prevent the ends of the lines from being drawn through the holes 17 and 17ª by the reel when the lines are wound on the spools, and to engage a suitable support to support the end of the lines when they are drawn out for use.

The operation of our improved reel and supporting device is as follows: Assuming the device to be secured in position to a suitable support and it is desired to put up the lines, the spindle and reel are moved axially until the locking element 12 is disengaged from the hole 13; the lines 16 and 16ª are then drawn off the spools 15 and 15ª through the openings 17 and 17ª and the ends thereof hooked to any suitable supports 20; the locking element 12 is then brought into registration with the hole 13, and the spindle 7 and reel 8 moved until the locking element 12 is inserted in the hole 13 thus locking the reel with each line supported at one end by a support 20 and at its other end by our improved reel and supporting device. When it is desired to take the lines out of the way when not in use, the ends of the lines are disengaged from the supports 20, the locking element 12 is disengaged from the hole 13, the reel is then rotated by the crank 11 until the lines are wound upon the spools and the locking element 12 is then inserted in the hole 13 whereby the reel is locked in position with the lines wound up thereupon.

The advantages of the construction of our invention lie principally in the bracket 1 and the spindle 7. The bracket may be made of a single piece of sheet metal by bending the same. The shape of the bracket is such that a long strip of sheet metal of the required width may be cut up into a number of pieces without any waste, from each of which pieces a bracket may be formed. The spindle 7 may be made from a piece of rod of the desired diameter and length by bending it into shape and stamping out the keys 10. From a long rod of suitable diameter a considerable number of spindles may be cut and made into the proper shape.

We do not limit ourselves to the precise details of construction herein shown and described as it is obvious that variations may be made without departing from the spirit of the invention.

Having described our invention we claim:

1. A device of the character disclosed comprising a bracket provided with spindle holes and a keyhole, a reel, a spindle adapted to be inserted through said spindle holes and reel to mount the reel in the bracket, a key on said spindle adapted to be inserted through said keyhole and driven into said reel to key the reel to the spindle and a crank for rotating the spindle and reel.

2. A device of the character disclosed comprising a bracket, a spindle mounted in the two opposite walls of the bracket to rotate and move axially with relation to the bracket, a reel mounted on the spindle between said walls, said reel adapted to engage said walls to limit the axial movement of the spindle, said spindle provided with a crank and a locking element, said bracket provided with means for co-acting with said locking element, when the spindle is moved axially in one direction, to lock the reel against rotation.

3. A device of the character described comprising a bracket, a spindle mounted in said bracket to rotate and move axially therein, a reel mounted upon said spindle adapted to engage said bracket to limit the axial movement of the spindle, said spindle provided with a crank and a locking element, said bracket provided with means for co-acting with said locking element, when the spindle is moved axially in one direction, to lock the reel against rotation.

4. A device of the character described comprising a bracket, a spindle mounted in said bracket to rotate and move axially therein, a reel mounted upon said spindle adapted to engage said bracket to limit the axial movement of the spindle, said spindle having one of its ends bent to form a crank and a locking element, said bracket provided with a hole to receive the locking element, when the spindle is moved axially in one direction, to lock the reel against rotation.

5. A device of the character described comprising a bracket, a spindle rotatably mounted and axially movable in said bracket, one end of said spindle being bent to form a crank and a locking element, said bracket provided with means for receiving the end of said locking element, when the spindle is moved axially in one direction, to lock the spindle against rotation.

In testimony whereof we have signed our names to this specification in the presence of two subscribing witnesses.

MICHAEL KRULAN.
AUGUST P. LAUSTER.

Witnesses:
J. Ross Millward,
Allan W. Foose.